US012424061B2

(12) United States Patent
Joseph

(10) Patent No.: US 12,424,061 B2
(45) Date of Patent: Sep. 23, 2025

(54) SYSTEM, METHOD, AND NON-TRANSITORY COMPUTER READABLE MEDIUM FOR SPORTS WAGERING

(71) Applicant: Text Bet Win, LLC, Las Vegas, NV (US)

(72) Inventor: Adam Keith Joseph, Las Vegas, NV (US)

(73) Assignee: TEXT BET WIN, LLC, Las Vegas, NV (US)

( * ) Notice: Subject to any disclaimer, the term of this patent is extended or adjusted under 35 U.S.C. 154(b) by 344 days.

(21) Appl. No.: 18/138,593

(22) Filed: Apr. 24, 2023

(65) Prior Publication Data

US 2023/0343183 A1 Oct. 26, 2023

Related U.S. Application Data

(60) Provisional application No. 63/334,460, filed on Apr. 25, 2022.

(51) Int. Cl.
*G07F 17/32* (2006.01)

(52) U.S. Cl.
CPC ...... *G07F 17/3288* (2013.01); *G07F 17/3223* (2013.01); *G07F 17/323* (2013.01)

(58) Field of Classification Search
None
See application file for complete search history.

(56) References Cited

U.S. PATENT DOCUMENTS

| | | | |
|---|---|---|---|
| 8,764,556 | B2 | 7/2014 | Corbo |
| 9,592,450 | B2 | 3/2017 | Chun |
| 9,659,441 | B2 | 5/2017 | Kelly et al. |
| 9,807,186 | B1 | 10/2017 | Paul et al. |
| 10,535,230 | B2 | 1/2020 | Lutnick |
| 10,896,572 | B2 | 1/2021 | Li et al. |
| 10,943,435 | B2 | 3/2021 | Hall et al. |
| 11,080,963 | B1 | 8/2021 | Huke et al. |
| 11,127,257 | B2 | 9/2021 | Russell et al. |
| 11,195,373 | B2 | 12/2021 | Alderucci et al. |
| 11,238,694 | B2 | 2/2022 | Huke et al. |

(Continued)

FOREIGN PATENT DOCUMENTS

| | | | |
|---|---|---|---|
| AU | 2015101743 | A4 | 1/2016 |
| WO | 2017083909 | A1 | 5/2017 |
| WO | 21046519 | A1 | 3/2021 |

*Primary Examiner* — Ronald Laneau
(74) *Attorney, Agent, or Firm* — Howard & Howard Attorneys PLLC

(57) ABSTRACT

A system, method, and non-transitory computer readable medium for sports wagering include an application executable by a processor of a user computing device, wherein the application is configured to have the processor programmed with an algorithm to execute multi-factor and risk-based authentication instructions to identify a geographical area of the user and automatically generate a geofence for the geographical area, choose a game and a wager on the game within the geofence, set at least one predefined parameter for the game within the geofence, transmit the at least one predefined parameter and wager on the game, monitor the at least one predefined parameter for the game, determine whether the at least one predefined parameter is met, and transmit an actionable alert notification when the at least one predefined parameter is met.

18 Claims, 4 Drawing Sheets

100

(56) References Cited

U.S. PATENT DOCUMENTS

| | | | | |
|---|---|---|---|---|
| 11,244,535 | B2 | 2/2022 | Lutnick et al. | |
| 2009/0093300 | A1 | 4/2009 | Lutnick et al. | |
| 2013/0030556 | A1 | 1/2013 | Wolfe et al. | |
| 2014/0274320 | A1 | 9/2014 | Nguyen | |
| 2014/0323207 | A1 | 10/2014 | Lee | |
| 2017/0017657 | A1* | 1/2017 | English | G07F 17/3211 |
| 2020/0234544 | A1 | 7/2020 | Joao | |
| 2020/0242896 | A1 | 7/2020 | Higgins et al. | |
| 2020/0342717 | A1* | 10/2020 | Nelson | G07F 17/3288 |
| 2020/0357229 | A1 | 11/2020 | Joao | |
| 2021/0383645 | A1 | 12/2021 | Gupta et al. | |
| 2022/0005314 | A1* | 1/2022 | Harmon | G06Q 50/34 |
| 2025/0104519 | A1* | 3/2025 | Hiten | G07F 17/323 |

* cited by examiner

SYSTEM, METHOD, AND NON-TRANSITORY COMPUTER READABLE MEDIUM FOR SPORTS WAGERING

CROSS-REFERENCE TO RELATED APPLICATION(S)

The present invention claims priority to and the benefit of U.S. Provisional Patent Application Ser. No. 63/334,460, filed Apr. 25, 2022, which is hereby incorporated by reference in its entirety.

BACKGROUND OF THE INVENTION

Field of the Invention

The present invention relates generally to sports wagering and, more specifically, to a system, method, and non-transitory computer readable medium for sports wagering.

Description of Related Art

Wagering such as sports wagering is very popular with bettors and provides a significant source of revenue for licensed bookmakers. Traditionally, wagers are placed on sports games in a race and sports book within a casino, for example. A player or better can fill out a card, can walk up to a counter or can wager at a kiosk with the desired wager amount and the outcome the player wishes to wager on. However, having to physically travel to a location that legally offers sports betting may be inconvenient and costly. As a result, some prospective bettors who would like to bet on sports games may be prevented or discouraged from doing so. This leads to a loss in gaming revenue for race and sports books, casinos, and other gaming establishments. Since people who bet on sports games are more likely to watch the games, this may also lead to a loss of advertising and other revenue for sports franchises and media distribution companies.

Currently, there are multiple mobile sports wagering applications that allow online betting. Most of these sports wagering applications are mobile applications. One of the problems with existing sport wagering applications is that the applications require constant accessing, rotating, and checking to determine what is occurring for the sporting event. Another problem is that existing sports wagering applications are difficult to access and parameters such as the money lines and point spreads are constantly changing. Yet another problem is that existing sports wagering applications require understanding favorable bets and money line and point spread timing, which requires continuous monitoring. Still another problem with existing sport wagering applications is that a user must access each sports wagering application to see, for example, where the money line is. A further problem with existing sports wagering applications is that accessing each application is time consuming. Yet a further problem of existing sports wagering applications is that geofencing does not exist for one application to prevent wagering or betting across state lines. Still a further problem of existing sports wagering applications is that there is a log-out feature that will log-out the user if the application is opened and not used within a predetermined time period.

The present invention is aimed at solving one or more of the problems identified above.

SUMMARY OF THE INVENTION

The present invention provides a system for sports wagering including a database configured to store data associated with a plurality of users, a computing system configured to communicate with the database, and an application executable by a processor of a user computing device and to communicate with the computing system. The application is configured to have the processor programmed with an algorithm to execute multi-factor and risk-based authentication instructions to identify a geographical area of the user and automatically generate a geofence for the geographical area, choose a game and a wager on the game within the geofence, set at least one predefined parameter for the game within the geofence, transmit the least one predefined parameter and wager on the game, monitor the at least one predefined parameter for the game, determine whether the at least one predefined parameter is met, and transmit an actionable alert notification when the at least one predefined parameter is met.

The present invention also provides a method for sports wagering including the steps of storing, in a database, data associated with a plurality of users, establishing by a computing system communication with the database, and executing an application by a processor of a user computing device and communicating with the user computing device, wherein the application is configured to have the processor programmed with an algorithm to execute multi-factor and risk-based authentication instructions identifying, by the computing system, a geographical area of the user and automatically generate a geofence for the geographical area, choosing, with the application, a game and a wager on the game within the geofence, setting, with the application, at least one predefined parameter for the game within the geofence, transmitting, by the user computing device, the at least one predefined parameter and wager on the game, monitoring, by the computing system, the at least one predefined parameter for the game, determining, by the computing system, whether the at least one predefined parameter is met, and transmitting, by the computing system, an actionable alert notification to the user computing device when the at least one predefined parameter is met.

The present invention further provides a non-transitory computer readable medium having computer-executable multi-factor and risk-based authentication instructions for execution by one or more computing devices for sports wagering. The computer-executable instructions are programmed as an algorithm to identify a geographical area of a user and automatically generate a geofence for the geographical area, choose a game and a wager on the game within the geofence, set at least one predefined parameter for the game within the geofence, transmit the at least one predefined parameter and wager on the game, monitor the at least one predefined parameter for the game, determine whether the at least one predefined parameter is met, and transmit an actionable alert notification when the at least one parameter is met.

One advantage of the present invention is that the system, method, and non-transitory computer readable medium provide a sports wagering or betting platform to support betting on sporting games. Another advantage of the present invention is that the system, method, and non-transitory computer readable medium allow sports wagering that interacts with third party sports wagering applications or licensed sports book operators. Yet another advantage of the present invention is that the system, method, and non-transitory computer readable medium provide the ability to set predefined parameters by a user that, when met, notify the user by an automated and actionable alert such as a push notification that the money line or point spread has moved to allow the bettor to quickly and seamlessly execute a predefined wager or bet. Still another advantage of the present invention is that the system, method, and non-transitory computer readable medium allows a predefined wager or bet to be confirmed by the better via biometrics such as voice, touch, or facial recognition. A further advantage of the present invention is that the system, method, and non-transitory computer readable medium allow bettors to receive real-time betting information based on predefined parameters for a seamless, efficient, and instantaneous betting confirmation through a licensed and/or outside sports book operator. Yet a further advantage of the present invention is that the system, method, and non-transitory computer readable medium allow users to receive real-time notifications and to set game parameters and confirm favorable bets instantaneously. Still a further advantage of the present invention is that the system, method, and non-transitory computer readable medium may use current geofencing with the sports wagering application that allows services to be used inside a geofence at a state level as well as any nationwide implementation or may be used outside geofencing. Yet a still further advantage of the present invention is that the sports wagering application has a continuous log-in to prevent the user from being logged out after a predetermined time period.

Other advantages and features of the present disclosure will be readily appreciated, as the same becomes better understood, by reference to the subsequent detailed description, when considered in connection with the accompanying drawings.

BRIEF DESCRIPTION OF THE DRAWINGS

Non-limiting and non-exhaustive embodiments of the present invention are described with reference to the following figures, wherein like numerals refer to like parts throughout the various views unless otherwise specified.

DETAILED DESCRIPTION OF THE PREFERRED EMBODIMENT(S)

Figure 1:
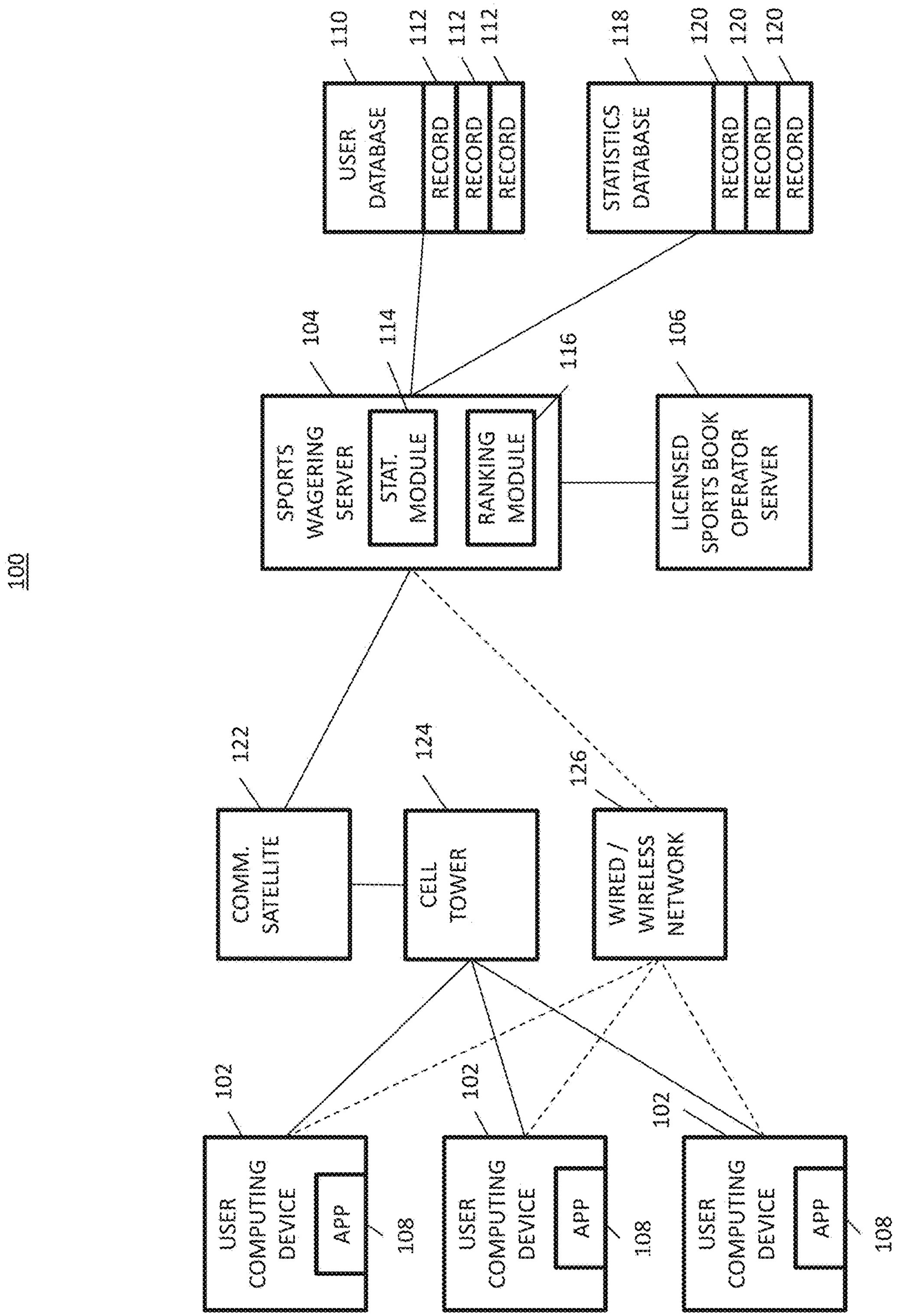
FIG. 1 is a block diagram illustrating an exemplary system for sports wagering, according to one embodiment of the present invention.

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an examples" means that a particular feature, structure, or characteristic described in connection with the embodiment of example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system". Furthermore, the present invention may take the form of a computer program product embodied in any tangible media or expression having computer-usable program code embodied in the media.

Any combination of one or more computer-usable or computer-readable media (or medium) may be utilized. For example, a computer-readable media may include one or more of a portable computer diskette, a hard disk, a random-access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisional via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The block diagram(s), flow diagram(s), and flowchart(s) illustrate the architecture, functionality, and operation of possible implementations of systems, methods, and computer program products according to various embodiments of the present invention. In this regard, each block in the flowchart, flow diagrams, or block diagrams may represent a module, segment, or portion of code, which comprises one or more executable instructions for implementing the specified logical function(s). It will also be noted that each block of the block diagrams, flow diagrams, and/or flowchart illustrations, and combinations of blocks in the block diagrams, flow diagrams, and/or flowchart illustrations, may be implemented by special purpose hardware-based systems that perform the specified functions or acts, or combinations of special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart, flow diagram, and/or block diagram block or blocks.

Several (or different) elements discussed below, and/or claimed, are described as being "coupled", "in communication with" or "configured to be in communication with". This terminology is intended to be non-limiting, and where appropriate, be interpreted to include without limitation, wired and wireless communication using any one or a plurality of suitable protocols, as well as communication methods that are constantly maintained, are made on a periodic basis, and/or made or initiated on an as needed basis.

The present disclosure particularly describes a system, method, and non-transitory computer readable medium for enabling users to engage in sports wagering in a convenient, efficient, and social manner. The present disclosure provides a system, method, and non-transitory computer readable medium for sports wagering, more particularly, a sports wagering or betting platform to support wagering or betting on sporting games. The sports wagering platform includes a system, method, and non-transitory computer readable medium that will provide access to continuous real time online wagering and game information including betting lines, spreads, over/unders, as well as current scores and final end result scores of games. The sports wagering platform is available as an application that is delivered from a desktop or laptop browser, or on a mobile device such as a smart phone or tablet or interactive internet connected device as examples.

FIG. 1 is a block diagram of an exemplary system 100 that may be used for sports wagering, according to one embodiment of the present invention. As used herein, the term "wagering game" includes a contest or application in which a user or player is enabled to place a wager on the outcome of a game. In one embodiment, the system 100 enables a user or player to bet or wager on an outcome of a sports game (i.e., sports wagering) and events. In another embodiment, the system 100 may enable a player to place a wager on a poker game, a horse race, a blackjack game, or any other suitable game. In yet another embodiment, the system 100 enables a user or player to bet or wager on an outcome of politics, entertainment, and/or other events with a verifiable and definitive outcome (i.e. a presidential election between two candidates). As used herein, the term "wager" and "bet" are used synonymously, and may involve real money wagering, "free to play" wagering with credits having no monetary or intrinsic value, gifts, or any combination thereof.

In one embodiment, the system 100 includes one or more user computing devices 102, a sports wagering server 104, and one or more third party licensed and/or outside sports book operator server(s) 106. The various components of the system 100 may be connected or coupled together by one or more wired or wireless networks. Although three user computing devices 102 are illustrated in FIG. 1, the system 100 may include any suitable number of the user computing devices 102. Also, while the system 100 is illustrated with the above components, it should be appreciated that one or more components of the system 100 may be combined together or split apart while remaining within the scope of the disclosure.

The user computing device 102 is a computing device that may be operated by a user (sometimes referred to herein as a player) to place a wager on the game. The user computing devices 102 may include a mobile phone, a personal digital assistant (PDA), a tablet computer, an interactive internet connected device, a wearable computing device, a laptop computer, a desktop computer, a kiosk, a point-of-sale terminal, a virtual reality device, an augmented reality device, or any other suitable computing device that enables the user computing device 102 to operate as described herein. In one embodiment, a sports wagering application or "app" 108 is installed on each user computing device 102 to enable the user to wager on a game or event. In another embodiment, some or all of the functionality of user computing device 102 and/or application 108 may be embodied in a cashier-operated register, point-of-sale terminal, or the like.

The sports wagering server 104 is a computing device that enables multiple user computing devices 102 to place wagers on games. In one embodiment, the sports wagering server 104 stores user information for each user in a user database 110 and associates the user information with the user computing device 102 that each user uses to access the sports wagering server 104. The user information may be stored in a plurality of records 112 in the user database 110. The records 112 may include a username, a user password, a birth date, a scanned image of an identification document such as a driver's license or passport, funds available to the user, payment information including an account number to a financial institution used by the user, and/or any other suitable information or record. The sports wagering server 104 may retrieve the records 112 from the user database 110 by querying the user database 110 during operation.

In one embodiment, the sports wagering server 104 includes a statistics module 114 that tracks various statistics of each player and a ranking module 116 to rank the users. For example, the statistics module 114 may track a number of times and the amounts the user has bet on a particular game, a number of times a user has won a bet, a number of times a user has lost a bet, which games the user has bet on or followed, and/or any other suitable statistic. The statistics of each user may be stored in a statistics database 118 as a plurality of records 120 and may be retrieved by querying the statistics database 118. The records 120 and associated statistics may be transmitted to the ranking module 116 or to another suitable server or module to aggregate the statistics of all the users. In another embodiment, the ranking module 116 may query the statistics database 118 directly to receive the statistics of each user.

The licensed sports book operator server 106 is a computing device coupled to the sports wagering server 104 that provides wagering services to users. In one embodiment, the licensed sports wagering server 106 provides data to the sports wagering server 104, receives data from the sports wagering server 104, and places wagers on behalf of users based on the data. For example, a user may place a wager on a game using the user computing device 102. The sports wagering server 104 receives the wager and transmits the data representative of the wager to the licensed sports book operator server 106. The licensed sports book operator server 106 then places the wager and transmits any win amount resulting from the wager to the sports wagering server 104. In another embodiment, the licensed sports book operator server 106 transmits a notification of a win resulting from the wager to the sports wagering server 104 and the sports wagering server 104 determines the win amount. It should be appreciated that the licensed sports book operators also may have betting apps, for example, BETMGM, and the sports wagering server 104 receives data from these licensed sports book operators.

In one embodiment, the system 100 includes devices that enable the user computing devices 102 to transmit and receive data to and from the sports wagering server 104. The devices may include one or more communication satellites 122, one or more cellular towers 124, and devices forming one or more wired or wireless networks 126. In one embodiment in which the user computing devices 102 are cellular phones, the user computing devices 102 may communicate with the sports wagering server 104 by transmitting signals to the cellular tower 124 which then transmits the signals to the communication satellite 122. The communication satellite 122 transmits the signals to the sports wagering server 104. In turn, the sports wagering server 104 may transmit signals to the user computing devices 102 in the reverse direction via the communication satellite 122 and the cellular tower 124. It should be appreciated that the user computing devices 102 may communicate with the sports wagering server 104 via one or more wired or wireless of the networks 126, such as the Internet.

In one embodiment, the signals transmitted between the user computing devices 102 and the sports wagering server 104 are encrypted using a suitable encryption algorithm. For example, the signals may be encrypted using a public key infrastructure (PKI) algorithm. In another embodiment, the signals may be encrypted using any suitable algorithm.

Figure 2:
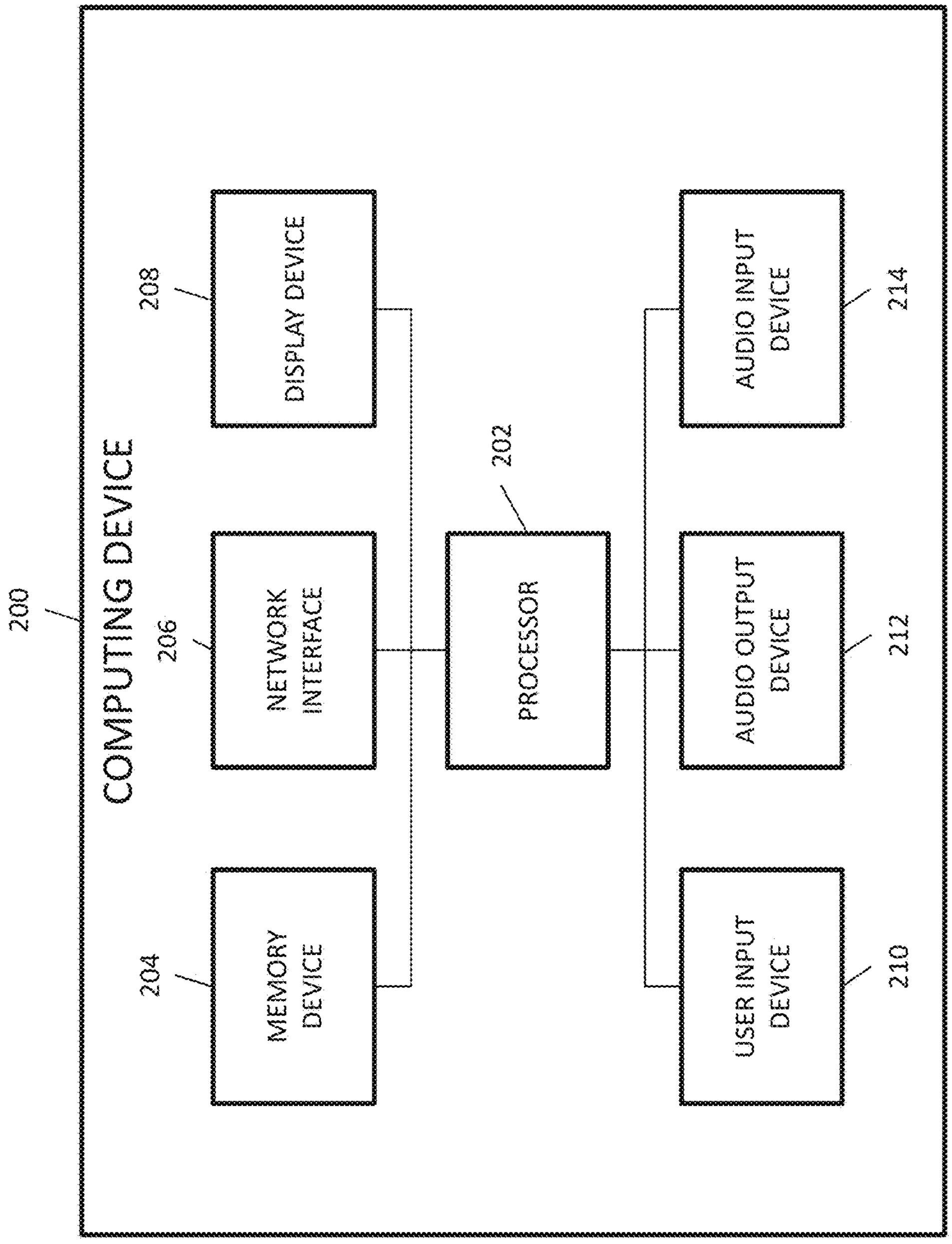
FIG. 2 is a block diagram of an exemplary user computing device that may be used with the system shown in FIG. 1.

FIG. 2 is a block diagram of one embodiment of a user computing device 102 that may be used with the system 100 (shown in FIG. 1). In one embodiment, the user computing device 102, sports wagering server 104, and/or licensed sports book operator server 106 described in the system 100 may be implemented as the user computing device 102. However, it should be recognized that one or more components of the system 100 may not be included in the user computing device 102 such as the sports wagering server 104, and/or licensed sports book operator server 106.

In one embodiment, the user computing device 102 includes a processor 202, a computer-readable memory device 204, and a network interface 206. In one embodiment, the user computing device 102 may also include a display device 208, a user input device 210, an audio output device 212, and/or an audio input device 214. It should be appreciated that the memory device 204, network interface 206, display device 208, and user input device 210 (if provided) may be connected to the processor 202 and/or to each other via any suitable bus or busses, interfaces, or other mechanisms.

The processor 202 includes any suitable programmable circuit including one or more microcontrollers, microprocessors, application specific integrated circuits (ASICs), systems on a chip (SoCs), programmable logic circuits (PLCs), field programmable gate arrays (FPGAs), and/or any other circuit capable of executing the functions described herein. The above examples are exemplary only, and thus are not intended to limit in any way the definition and/or meaning of the term "processor."

The memory device 204 is an electronic storage device that includes one or more non-transitory computer readable medium, such as, without limitation, random access memory (RAM), flash memory, a hard disk drive, a solid-state drive, a compact disc, a digital video disc, and/or any suitable memory. The memory device 204 may include data as well as instructions that are executable by the processor 202 to program the processor 202 to perform the functions described herein. For example, the methods described herein may be performed by one or more processors 202 executing instructions stored within one or more of the memory devices 204.

The network interface 206 may include, without limitation, a network interface controller (NIC) or adapter, a radio frequency (RF) transceiver, a public switched telephone network (PSTN) interface controller, or any other communication device that enables the user computing device 102 to operate as described herein. In one embodiment, the network interface 206 may connect to the network interfaces 206 of the other user computing devices 102 of the system 100 through a network using any suitable wireless or wired communication protocol.

The display device 208 may include, without limitation, a liquid crystal display (LCD), a vacuum fluorescent display (VFD), a cathode ray tube (CRT), a plasma display, a light-emitting diode (LED) display, a projection display, a display integrated into a virtual reality or augmented reality device, a virtual reality device, a wearable device, and/or any suitable visual output device capable of displaying graphical data and text to a user. For example, the display device 208 may be used to display a graphical user interface 500 associated with the sports wagering application 108 to the user.

The user input device 210 may include, without limitation, a keyboard, a keypad, a touch screen, a mouse, a scroll wheel, a pointing device, a video input device that registers movement of a user (e.g., usable with an augmented reality input device or a virtual reality input device), and/or any other suitable device that enables the user to input data into the user computing device 102 and/or retrieve data from the user computing device 102.

The audio output device 212 may include, without limitation, one or more speakers or any other device that enables content to be audibly output from the computing device 200. For example, music or other audio content associated with one or more games may be audibly output from the audio output device 212.

The audio input device 214 may include a microphone or another suitable device that enables the user to input audio commands into the user computing device 102. The audio input device 214 may employ speech recognition software to convert spoken commands from the user into digital data for use in operating the user computing device 102.

While the foregoing components have been described as being included within the user computing device 102, it should be appreciated that at least some of the user computing devices 102 may not include each component. For example, a server may not include the audio output device 212, audio input device 214, user input device 210, and/or display device 208. In addition, the user computing device 102 may include any suitable number of each individual computing device component. For example, the user computing device 102 may include a plurality of the processors 202 or processor cores, a plurality of the memory devices 204 (of the same or different types, sizes, etc.), and/or a plurality of the display devices 208.

Figure 3:
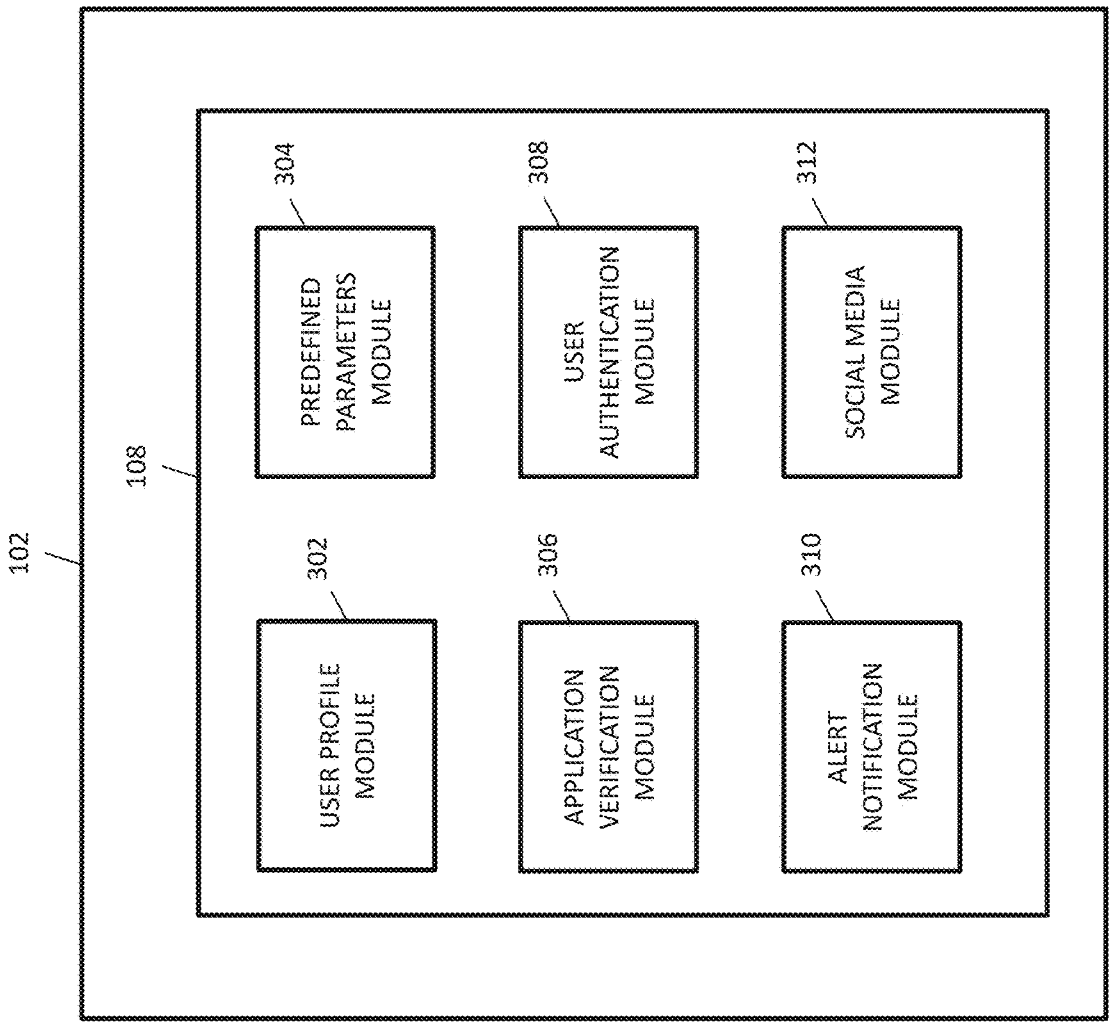
FIG. 3 is a block diagram of an exemplary sports wagering application, according to one embodiment of the present invention, that may be used with the user computing device shown in FIG. 2.

FIG. 3 is a block diagram of an exemplary sports wagering application 108, according to one embodiment of the present invention, that is executable on the user computing device 102 (shown in FIG. 2) and that may be used with the system 100 (shown in FIG. 1). In one embodiment, the user computing device 102 may include a plurality of modules that may be embodied as one or more software modules within the sports wagering application 108. In another embodiment, each module may include firmware and/or hardware components in addition to, or instead of, the software components within the sports wagering application 108. The modules may include, for example, a user profile module 302, a predefined parameters module 304, an application verification module 306, a user authentication module 308, an alert notification module 310, and a social media module 312.

The user profile module 302 is a module that stores user information such as username, full name, email address, password, and telephone number that is personal to the user. The profile module 302 may be used to display the profile of the user. The information may be unlocked or decrypted using, for example, a password, a pin number, a pattern entered into the user input device 210, biometrics such as a scan of the user's fingerprint, and/or any other suitable key.

The predefined parameters module 304 is a module that allows the user to set predefined parameters in the sports wagering application 108. The predefined parameters may include, for example, money line, point spreads, game totals, player injuries, weather, player stats, team trends, player arrests, team contracts & free agency, team trades, team steam, social media, and team in-game within the predefined parameter module 304. For example, the predefined parameter for player injuries would allow the user to predefine their team such as when a starting quarterback, wide receiver, or linebacker is out of the lineup, and, when the point spread is −6 or less, the team loses 83% of the time. For example, the predefined parameter for weather would allow the user to predefine the weather such as the % chance of rain or snow five minutes before kickoff in every NFL game starting after 1 pm PST. For example, the predefined parameter for player stats would allow the user to predefine player stats such as when, for example, Dax Prescott is leading at halftime, but the halftime number is the team Dallas Cowboys −5 or less, and he wins the game 85% of the time. It should be appreciated that, as a favorable bet, the user will only have interest if they open up in these parameters.

For example, the predefined parameter for team trends would allow the user to predefine team trends such as when the team Broncos are −3 or less and coming off a loss the week before they are 70%, but when they are −2.5 or less coming off a loss, they are 100% covering the point spread the next game. For example, the predefined parameter for player arrests would allow the user to predefine player arrests such as if player Derek Carr is arrested and the point spread moves more than 7.5 points in either direction, the user would take the listed underdog. For example, the predefined parameter for team contracts & free agency would allow the user to predefine team contracts and free agency such as if the team NY Giants draft a quarterback as their first pick and their season win total is listed at 6.5 wins or higher, NFL teams are 80% to the "over" in this situation. For example, the predefined parameter for team trades would allow the user to predefine team trades such as if the team New England Patriots traded any first-round draft pick who started 24 or more games in his first two years, they are 42% in the next year on their season win projections. For example, the predefined parameter for team steam would allow the user to predefine team steam such as if in a two-minute period the team Los Angeles Lakers move more than 2 points after a home win, they are 26% versus the points spread. For example, the predefined parameter for social media would allow the user to predefine social media such as if the NFL Network twitter account confirmed the Los Angeles Rams game moved from 1 PM EST to 8 PM EST in which they are 9-2 in night games on Sunday. For example, the predefined parameter for team in-game would allow the user to predefine team in-game such as when the Green Bay Packers are up two (2) touchdowns and the current in-game money line is less than −17.5 points, the team covers the spread 61% of the time. It should be appreciated that other parameters for the game may be predefined. It should also be appreciated that by setting the predefined parameters for the game, users can receive real-time notifications and confirm favorable bets securely and instantly both inside and outside a geofence.

The application verification module 306 may be executed by the processor 202 to verify the integrity of the sports wagering application 108 to the sports wagering server 104. For example, when the processor 202 uses the sports wagering application 108 to initiate a connection with the sports wagering server 104, the sports wagering server 104 may request application integrity or verification information from the application verification module 306 to ensure that the sports wagering application 108 has not been tampered with or otherwise altered in an unauthorized manner. Accordingly, the application verification module 306 may calculate and store a digital fingerprint of the sports wagering application 108, such as by executing a hash algorithm on the files of the sports wagering application 108. The resulting application fingerprint may be stored in the application verification module 306 (or another suitable portion of the memory device 204) and may be transmitted to the sports wagering server 104 in response to receiving an application verification or integrity request from the sports wagering server 104. The sports wagering server 104 may compare the application fingerprint to a reference fingerprint stored on the sports wagering server 104 to verify the application fingerprint (and thus the sports wagering application 108). If the application fingerprint matches the reference fingerprint, the sports wagering application 108 (and by extension, the user computing device 102) may be verified and may be allowed to access the sports wagering server 104 to place wagers, for example.

The user authentication module 308 may be executed by the processor 202 to authorize a user (also referred to as a player) to access the sport wagering application 108 on the user computing device 102 and/or to access the sports wagering server 104 using the user computing device 102. For example, when a user opens or accesses the sports wagering application 108 using the user computing device 102, the user authentication module 308 may prompt the user to enter a username and password, or another suitable access key such as a biometric data, for example, a fingerprint, or secure key fob, to access the sports wagering application 108 and/or to log in to the sports wagering server 104. The user authentication module 308 may transmit a connection request to the sports wagering server 104 with the username and password (or other access key) entered by the user. The sports wagering server 104 may compare the username and password (or biometric data such as a fingerprint of either or both) to a stored record containing the correct username and password of the user. If the username and password are correct, the sports wagering server 104 may enable the sports wagering application 108 (and the user computing device 102) to access the sports wagering server 104 and to place wagers on a game, for example. In addition, the user authentication module 308 may be used to capture an image of a user identification document, such as a passport or driver's license. The image may be stored in the user authentication module 310 (or another suitable portion of the memory device 204) and may be transmitted to the sports wagering server 104 to verify the identity of the user. The user authentication module 310 may also capture a voice of the user for identification purposes. It should be appreciated that the user authentication module allows biometric information to be used such as face ID, touch ID, and voice recognition. It should be appreciated that the user authentication module 308 allows the user to have a continuous log-in once logged in to the sports wagering application 108.

The alert notification module 310 may be executed by the processor 202 to notify or alert the user if one or more predefined parameters of the predefined parameters module 304 is hit or met. For example, if the money line moves such that it hits or meets the predetermined parameter amount, the alert notification module 310 sends an automated and actionable alert to the user to notify the user of the movement of the money line. In addition, the alert notification module 310 may also include messaging information for the actionable alert having data and information to be sent to the user computing device 102 associated with the corresponding user profile and/or API information associated with the corresponding user computing device 102. The messaging information for the actionable alert may be sent via a push notification such as through SMS, MMS, RCS, and/or any other type of messaging application. In one embodiment, the actionable messaging information may also include that the money line has moved and to accept the predetermined wager. It should be appreciated that the actionable alert may be sent from the licensed and/or outside sports book operator to the user either inside or outside the geofence.

The social media module 312 may be executed by the processor 202 to display social media feeds or other content to the user. The social media feeds may be transmitted by the sports wagering server 104 or by another suitable server coupled to the user computing device 102. The social media module 312 may also be used to log the user into one or more social media accounts to enable the user to post content on the social media accounts and to access friend or contact lists, for example.

The system 100 includes a client component on the user computing device 102 in communication with a geofence service (e.g., as embodied by a geofence component), which can reside on a network (e.g., the Internet) to provide the geofence service to myriad other users and various user devices such as portable computers, tablet computers, smartphones, etc.

The geofence service accesses a database of entity summaries (information) about many different entities, such as an entity (having an associated geo-point) to be geofenced. The entity summaries can serve as the basis from which to establish the characteristics (e.g., category) about various entities. The summary is a geographical reference of information about an entity used in conjunction with a map. The summary can include, but is not limited to, information related to the geographical makeup, social statistics and physical features of a country, region, or continent.

As the user computing device 102 is detected relative to the geofence, the evaluation component manages triggering of the geofence based on location of the user computing device 102. The coordinates or other location information of the user computing device 102 are matched to coordinate information of the geofence. When there is an agreement, equivalency, or intersection, between the geofence virtual perimeter definition and the location information, a triggered event occurs, such as sending a notification, alert, etc., for example.

In operation of the sports wagering application 108, a user clicks on the drop-down to access their team's parameter set. The user chooses their desired set. For example, the user may want to be notified when the Dallas Cowboys are up by 14 by the end of the $2^{nd}$ Quarter. The user then saves their set and is ready to be notified of their preferred line. Once the user's parameter is hit or exceeded, the user will receive a notification in real-time. With biometrics, the user can confirm their wager through Face ID, Touch ID, and/or Voice Recognition. It should be appreciated that utilizing geofencing with the sports wagering application 108, the user can instantly confirm their bet and know that they wagered at the most favorable time.

Figure 4:
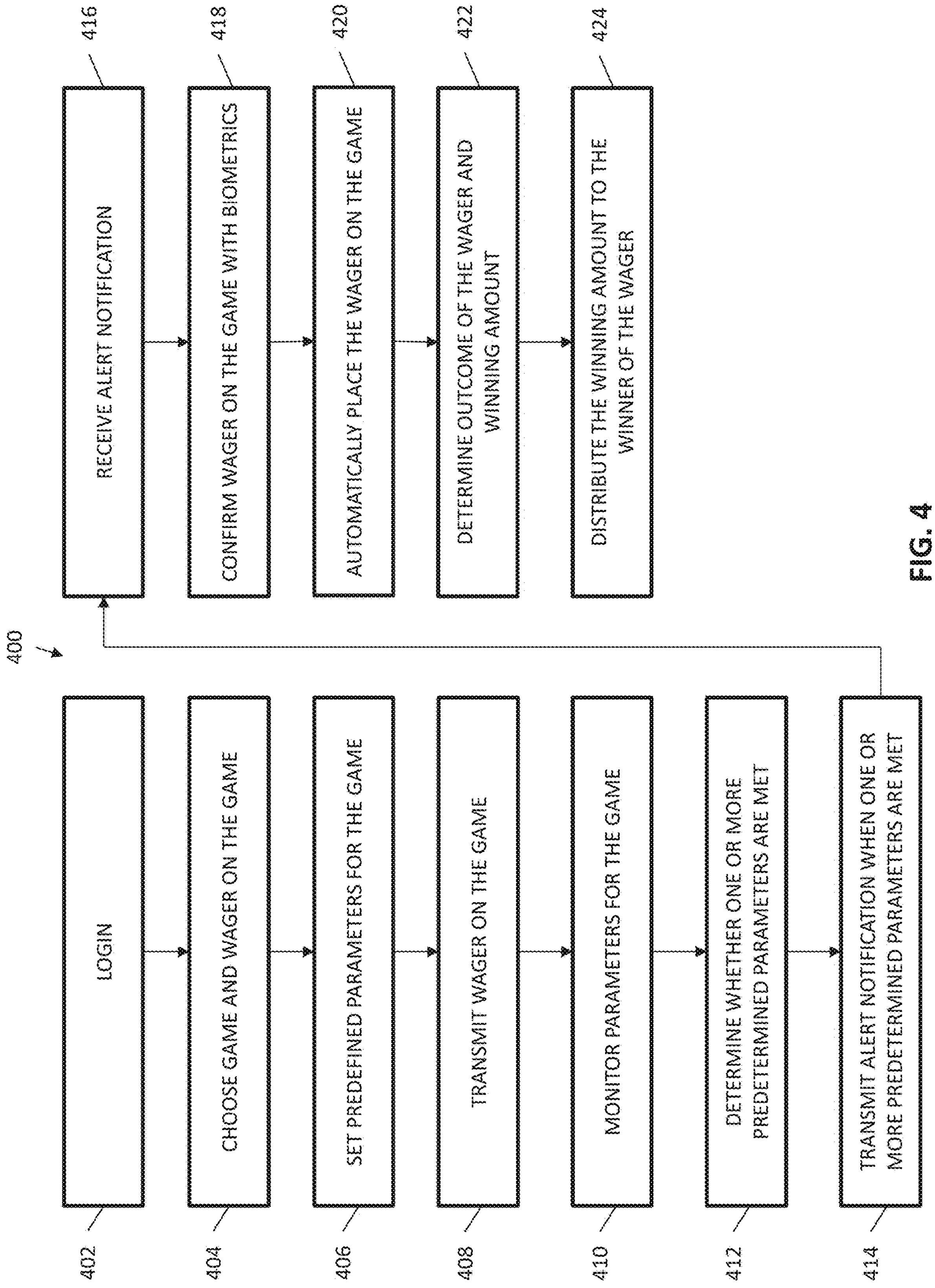
FIG. 4 is a flowchart of an exemplary method of sports wagering, according to one embodiment of the present invention, that may be used with the application of FIG. 3 and the system shown in FIG. 1.

FIG. 4 is a flow diagram of an exemplary method 400 of the sports wagering or betting on a game, such as a sports game, according to one embodiment of the present invention, that may be used with the system 100 (shown in FIG. 1). While the method 400 is described with reference to a sports wagering game, it should be appreciated that the method 400 may be used with any suitable wagering game. The method 400 may be implemented by the user computing device 102 and/or sport wagering server 104 (shown in FIG. 1), such as by the processor 202 of the user computing device 102 and/or sports wagering server 104 executing computer-readable multi-factor and risk-based authentication instructions stored within the memory device 204 of the user computing device 102 and/or sports wagering server 104. In another embodiment, the method 400 may be implemented by any suitable device of the system 100.

In one embodiment, the method 400 is programmed as an algorithm to include the step 402 of logging in by a user of the user computing device 102 of the sports wagering application (or app) to wager on one or more sports games. For example, a user may use a cellular phone to access the sports wagering application 108 to place one or more wagers on one or more games. Once logged-in, the user is identified by the geographical location of the user and continuously logged in inside the geofence. The method 400 includes the step 404 in which the user chooses or selects the game and the wager on the game. For example, the user may select a football game and a twenty-dollar wager on the game. The method 400 includes the step 406 in which the user sets predefined parameters for the game. For example, the user may set predefined parameters that may include, for example, money line, points spread, game totals, player injuries, weather, player stats, team trends, player arrests, team contracts & free agency, team trades, team steam, social media, and team in-game. The method 400 includes the step 408 of transmitting the wager on the game to the sports wagering server 104. For example, the user transmits the game chosen, predetermined parameters, and wager on the game to the sports wagering server 104 with the user computing device 102.

In one embodiment, the user may participate in pre-game wagering before the game is started. For example, in pre-game wagering, the Denver Broncos point spread is at −3, meaning, if they win by 3, the user gets their wager back. If the Denver Broncos win by 4 or more, the user wins their bet. However, it would be more favorable if the point spread was −2.5. Consequently, when the point spread goes from −3 to −2.5, it becomes "bet heavy" as others begin to wager, raising the line back to −3. It should be appreciated that, by setting game predefined parameters such as this wager would be executed only when and if the Denver Broncos move from −3 to −2.5, users can receive real-time notifications and confirm favorable bets securely and instantaneous.

In another embodiment, the user may participate in true in-game wagering once the game is started. For example, in in-game wagering, the user clicks the drop-down to access their team's parameter set. The user chooses their desired set. In this case, the user wants to be notified when the Dallas Cowboys are up by fourteen (14) by the end of the second quarter. The user saves their set and are ready to be notified of their preferred money line or point spread.

The method 400 includes the step 410 of monitoring the predefined parameters for the game. For example, the sports wagering server 104 monitors the predefined parameters set by the user on the game. The method 400 includes the step 412 of determining whether at least one of the predetermined parameters that are monitored have been met. For example, the sports wagering server 104 determines whether the money line has moved more than a predetermined amount. The method 400 includes the step 414 of transmitting an actionable alert notification when one or more of the predefined parameters is met. For example, the sports wagering server 104 or licensed and/or outside sports book operator server 106 transmits an actionable alert notification when the sports wagering server 104 has determined that the at least one predefined parameter is hit or met by sending, for example, a push notification to the user.

The method 400 includes the step 416 of receiving the alert notification. For example, the user receives the alert notification via, for example, a push notification on the user computing device 102. The method 400 includes the step 418 of confirming the predefined wager or bet on the game with biometrics. For example, the user views the alert notification with biometrics such as voice, touch, or facial recognition to execute the wager or bet on the game on behalf of the user and the sports wagering application 108 transmits the confirmation to the sports wagering server 104. The method 400 includes the step 420 of automatically placing the wager on the game according to the agreed wagering activity. For example, the licensed sports book operator server 106 then places the wager for the user. The method 400 includes the step 422 of determining the outcome of the wager and winning amount. For example, the licensed sports book operator server 106 determines who won the wager and calculates the winning amount. The method 400 includes the step 424 of distributing the winning amount to the winner of the wager. For example, the sports wagering server 104 distributes an associated winning amount to each user that won the wager.

In one embodiment, the wagering activities and results are tracked for each user who is using the system 100 to wager on one or more games. For example, as each user places a wager on a game, the wager details are tracked and stored by the sports wagering server 104 in the statistics database 118. The results of each wager (e.g., whether the user won the wager), are also stored in the statistics database 118.

Leaders are then identified for each game. For example, the ranking module 116 may query the statistics database 118 after each game concludes to determine which users have the highest win percentage for the particular game or game type and may select those users to be leaders. In one embodiment, the ranking module 116 may query the statistics database 118 periodically, such as every 5 minutes, every hour, every day, or at any other suitable frequency to determine which users have the highest win percentage. In one embodiment, the ranking module 116 selects a predetermined number of the users with the highest win percentage for a game to be leaders of that game. While the ranking module 116 is described herein as selecting the predetermined number of users with the highest win percentage, it should be appreciated that other criteria may be used to select the leaders in addition to, or instead of, the highest win percentage. For example, the ranking module 116 may select the users with the highest total number of wins for a game to be leaders of the game, and/or may select leaders using any other suitable criteria.

The selected leaders for each game are then ranked according to one or more ranking criteria. For example, the ranking criteria may include the number of wagers won, the win percentage of the user, alphabetical ranking based on username, geographical ranking based on proximity to the user or based on a location or jurisdiction of the user, any combination of the foregoing, and/or any other suitable ranking criteria. The ranked list of leaders for each game may be transmitted to the user computing device 102 to be displayed on the display device 208.

Although specific features of various embodiments of the disclosure may be shown in some drawings and not in others, this is for convenience only. In accordance with the principles of the disclosure, any feature of a drawing or other embodiment may be referenced and/or claimed in combination with any feature of any other drawing or embodiment.

This written description uses examples to describe embodiments of the disclosure and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for sports wagering comprising:
- a database configured to store data associated with a plurality of users;
- a computing system configured to communicate with the database; and,
- an application executable by a processor of a user computing device and to communicate with the computing system, wherein the application is configured to have the processor programmed with an algorithm to execute multi-factor and risk-based authentication instructions to:
  - identify a geographical area of the user and automatically generate a geofence for the geographical area;
  - choose a game and a wager on the game within the geofence;
  - set at least one predefined parameter for the game within the geofence;
  - transmit the at least one predefined parameter and wager on the game;
  - monitor the at least one predefined parameter for the game;
  - determine whether the at least one predefined parameter is met; and
  - transmit an actionable alert notification when the at least one predefined parameter is met.

2. The system as set forth in claim 1, wherein the computing system is configured to notify the user by the alert notification using a push notification.

3. The system as set forth in claim 2, wherein the computing system confirms the wager on the game with biometrics.

4. The system as set forth in claim 3, wherein the computing system automatically places the wager on the game according to the agreed wagering activity.

5. The system as set forth in claim 4, wherein the computing system determines an outcome of the wager and winning amount.

6. The system as set forth in claim 4, wherein the computing system settles payment by distributing the winning amount directly to the winner of the wager.

7. A method for sports wagering comprising the steps of:
- storing, in a database, data associated with a plurality of users;
- establishing, by a computing system, communication with the database;
- executing an application by a processor of a user computing device to communicate with the computing system, wherein the application is configured to have the processor programmed with an algorithm to execute multi-factor and risk-based authentication instructions:
- identifying, by the computing system, a geographical area of the user and automatically generate a geofence for the geographical area;
- choosing, with the application, a game and a wager on the game within the geofence;
- setting, with the application, at least one predefined parameter for the game within the geofence;
- transmitting, by the user computing device, the at least one predefined parameter and wager on the game;
- monitoring, by the computing system, the at least one predefined parameter for the game;
- determining, by the computing system, whether the at least one predefined parameter is met; and
- transmitting, by the computing system, an actionable alert notification to the user computing device when the at least one predefined parameter is met.

8. The method as set forth in claim 7, including the step of notifying, by the computing system, the user by the alert notification using a push notification.

9. The method as set forth in claim 8, including the step of confirming, with the application, the wager on the game with biometrics.

10. The method as set forth in claim 9, including the step of automatically placing, by the computing system, the wager on the game according to the agreed wagering activity.

11. The method as set forth in claim 10, including the step of determining, by the computing system, an outcome of the wager and winning amount.

12. The method as set forth in claim 11, including the step of distributing, by the computing system, the winning amount directly to the winner of the wager.

13. A non-transitory computer readable medium having computer-executable multi-factor and risk-based authentication instructions for execution by one or more computing devices for sports wagering, the computer-executable instructions programmed as an algorithm to:
- identify a geographical area of a user and automatically generate a geofence for the geographical area;
- choosing a game and a wager on the game within the geofence;
- setting at least one predefined parameter for the game within the geofence;
- transmitting the at least one predefined parameter and wager on the game;
- monitoring the at least one predefined parameter for the game;
- determining whether the at least one predefined parameter is met; and
- transmitting an actionable alert notification when the at least one predefined parameter is met.

14. The non-transitory computer readable medium of claim 13, wherein the computer-executable instructions comprise the step of notifying the user by the alert notification using a push notification.

15. The non-transitory computer readable medium of claim 14, wherein the computer-executable instructions comprise the step of confirming the wager on the game with biometrics.

16. The non-transitory computer readable medium of claim 15, wherein the computer-executable instructions comprise the step of automatically placing the wager on the game according to the agreed wagering activity.

17. The non-transitory computer readable medium of claim 16, wherein the computer-executable instructions comprise the step of determining an outcome of the wager and winning amount.

18. The non-transitory computer readable medium of claim 17, wherein the computer-executable instructions comprise the step of distributing the winning amount directly to the winner of the wager.

* * * * *